US009672742B2

(12) United States Patent
Chang

(10) Patent No.: US 9,672,742 B2
(45) Date of Patent: Jun. 6, 2017

(54) DETECTING DEVICE, CLOUD SERVER, AND PARKING SPACE MANAGING SYSTEM

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/816,715

(22) Filed: Aug. 3, 2015

(65) Prior Publication Data

US 2016/0275794 A1 Sep. 22, 2016

(30) Foreign Application Priority Data

Mar. 16, 2015 (CN) .......................... 2015 1 0113575

(51) Int. Cl.
*B60Q 1/48* (2006.01)
*G08G 1/14* (2006.01)

(52) U.S. Cl.
CPC ............. *G08G 1/144* (2013.01); *G08G 1/146* (2013.01)

(58) Field of Classification Search
CPC ............................... G08G 1/144; G08G 1/146
USPC ........ 340/932.2, 932.1, 933, 870.11, 539.32, 340/573.4, 5.81, 5.61, 901; 705/5, 13, 705/14.58
See application file for complete search history.

(56) References Cited

U.S. PATENT DOCUMENTS

2014/0180774 A1* 6/2014 Rangarajan ........ G06Q 30/0284 705/13
2015/0130641 A1* 5/2015 Rahman ................. G08G 1/142 340/932.2
2015/0181371 A1* 6/2015 Steiner .................... H04W 4/02 455/456.2
2016/0156638 A1* 6/2016 Somani ................... H04L 63/12 726/7

* cited by examiner

*Primary Examiner* — Dhaval Patel
(74) *Attorney, Agent, or Firm* — Steven Reiss

(57) ABSTRACT

A detecting device is mounted in a parking lot including parking regions, and can communicate with a cloud server and one mobile terminal entering the parking lot. The cloud server stores an electronic map of the parking lot. The detecting device includes a distance sensor and a positioning device. The distance sensor detects occupied information of each parking space of each parking region and transmits the occupied information to the cloud server. The positioning device detects an original location of one mobile terminal entering the parking lot and transmits the original location to the cloud server, so that the cloud server can update the electronic map to indicate the occupied information and the original location.

1 Claim, 13 Drawing Sheets

DETECTING DEVICE, CLOUD SERVER, AND PARKING SPACE MANAGING SYSTEM

FIELD

The subject matter herein generally relates to parking space management.

BACKGROUND

In parking lots, parking spaces are commonly designated by lines painted on the ground or road for parking vehicles such as cars. Parking spaces are often located only in specific areas. Additionally, some parking spaces can cost more money than others.

BRIEF DESCRIPTION OF THE DRAWINGS

Implementations of the present technology will now be described, by way of example only, with reference to the attached figures.

DETAILED DESCRIPTION

Figure 1:
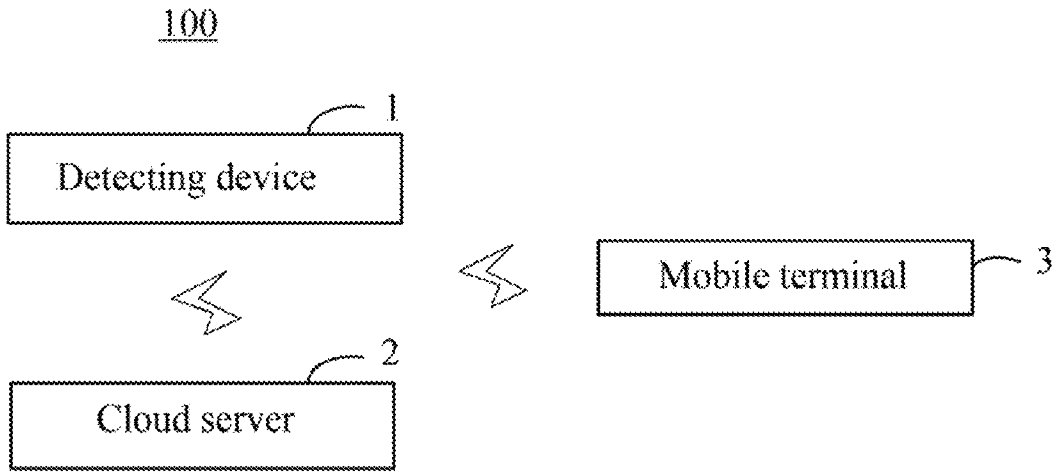
FIG. 1 is a block diagram of an embodiment of a parking space managing system applied among a detecting device and a cloud server according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an embodiment of a parking space managing system 100 applied among a detecting device 1 and a cloud server 2. The detecting device 1 is mounted in a parking lot 200 (shown in FIG. 2) and is able to wirelessly communicate with the cloud server 2 and one mobile terminal 3 in the parking lot 200. The cloud server 2 is further able to wirelessly communicate with the mobile terminal 3 in the parking lot 200. The mobile terminal 3 can be any electronic device having a wireless communication function, such as a smart phone, a tablet computer, or a multimedia player.

Figure 2:
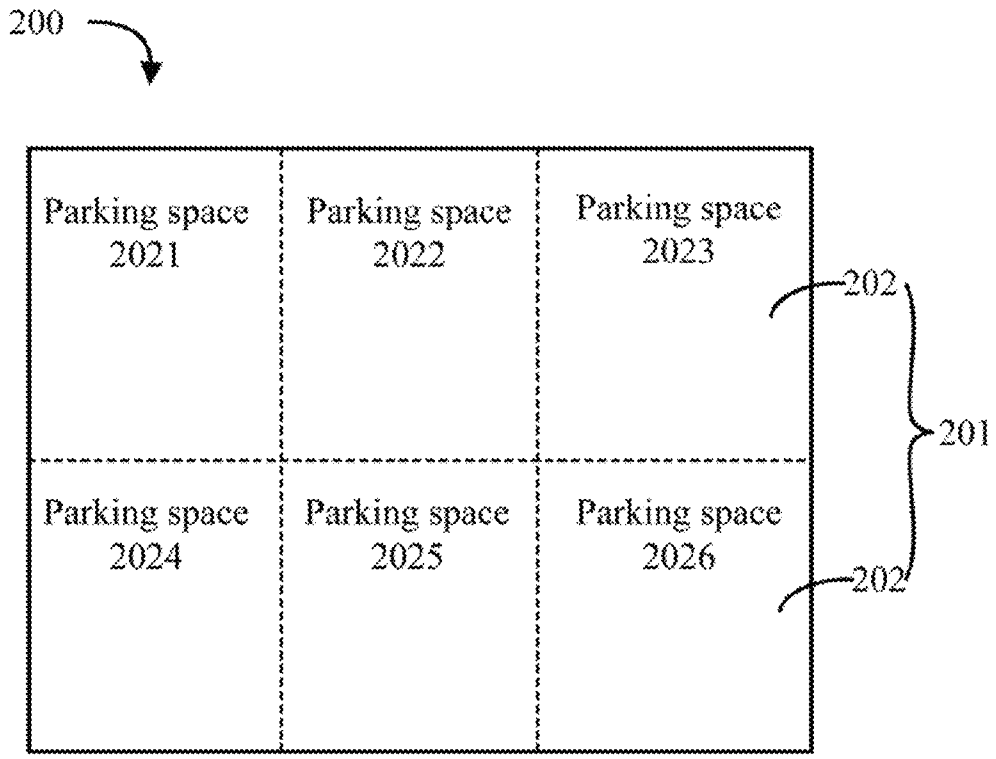
FIG. 2 is a diagrammatic view of a parking lot in which the parking space managing system of FIG. 1 is mounted.

FIG. 2 illustrates that the parking lot 200 includes a number of parking regions 201. Each parking region 201 includes at least one parking space 202.

Figure 3:
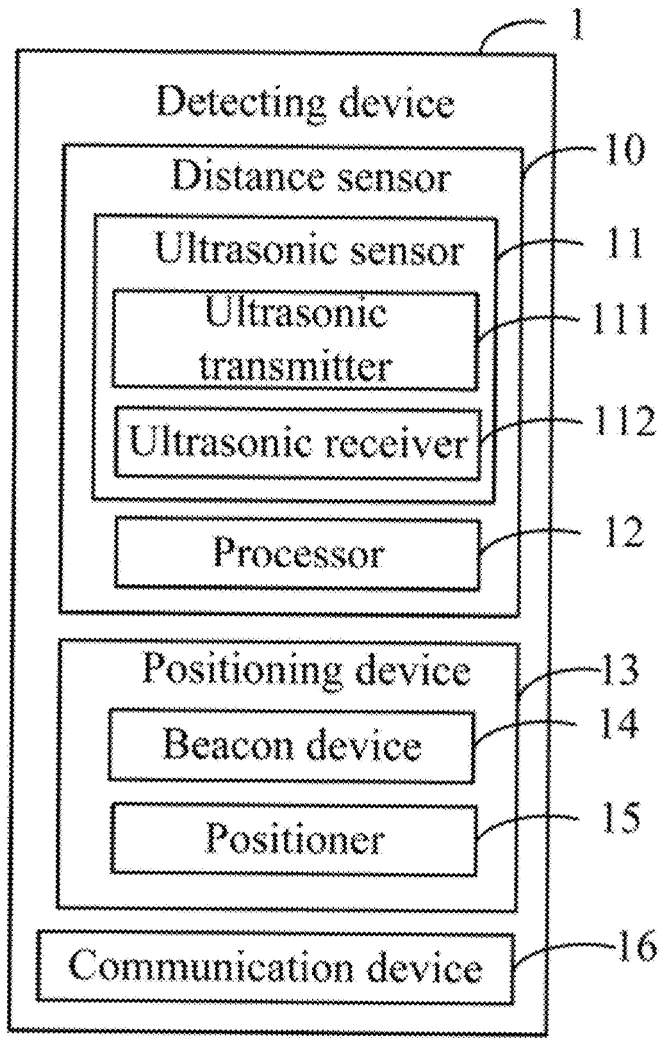
FIG. 3 is a block diagram of the detecting device of FIG. 1.

FIG. 3 illustrates that the detecting device 1 includes a distance sensor 10 configured to detect occupied information of each parking space 202 (that is, whether the parking space 202 is occupied or unoccupied). In at least one embodiment, the distance sensor 10 includes a number of ultrasonic sensors 11 and a processor 12. Each ultrasonic sensor 11 is mounted in one parking region 201 and includes an ultrasonic transmitter 111 and a corresponding ultrasonic receiver 112. The ultrasonic transmitter 111 transmits ultrasonic signals to each parking space 202 of the parking region 201 in which the ultrasonic sensor 11 is mounted to. When any parking space 202 has an obstacle (usually a vehicle), the ultrasonic signals can be reflected by the obstacle to cause a time duration of the ultrasonic signals travelling in the parking lot 200 to be shortened. The corresponding ultrasonic receiver 112 receives the reflected ultrasonic signals.

The number or the size of the parking regions 201 can be varied according to requirement. For example, each parking region 201 can include at least two parking spaces 202 (as shown in FIG. 2 that each parking region 201 includes two parking spaces 202), thereby decreasing the number of the ultrasonic sensors 11. In another embodiment, each parking region 201 can include only one parking space 202.

The processor 12 is electrically connected to each ultrasonic sensor 11. The processor 12 controls each ultrasonic transmitter 111 to transmit the ultrasonic signals, records an occurrence time of transmitting the ultrasonic signals (hereinafter, "transmitting time") and an occurrence time of receiving the ultrasonic signals (hereinafter, "receiving time"), calculates a time duration according to a difference between the transmitting time and the receiving time, and determines the occupied information of each parking space 202 according to the time duration. If the calculated time duration is greater than a preset time duration, the processor 12 determines that the parking space 202 is unoccupied. Otherwise, the processor 12 determines that the parking space 202 is occupied. The processor 12 further transmits the occupied information of each parking space 202 to the cloud server 2. In at least one embodiment, the processor 12 transmits the occupied information of each parking space 202 to the cloud server 2 via a WIFI network.

The detecting device 1 further includes a positioning device 13 and a communication device 16. In at least one embodiment, the positioning device 13 includes a number of beacon devices 14 and a positioner 15.

Figure 4:
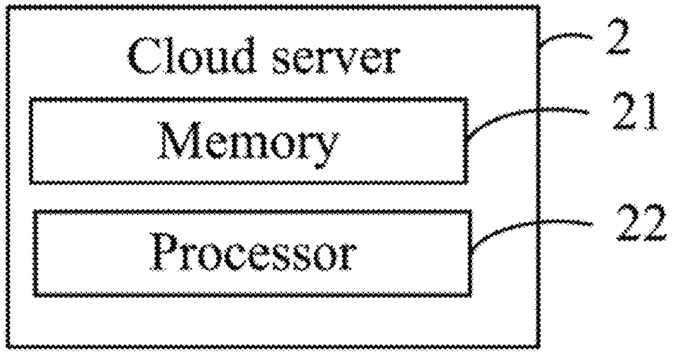
FIG. 4 is a block diagram of the cloud server of FIG. 1.

FIG. 4 illustrates that the cloud server 2 includes a memory 21 and a processor 22. The memory 21 stores a two-dimensional or three-dimensional electronic map 300 (shown in FIG. 5) of the parking lot 200.

Figure 5:
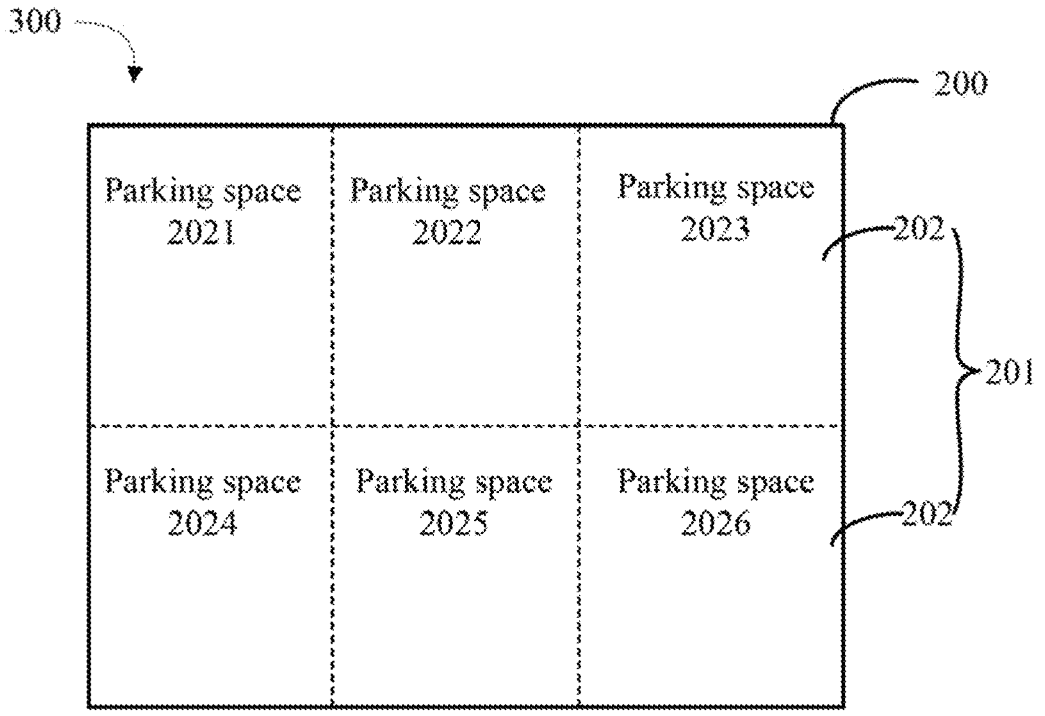
FIG. 5 is a diagrammatic view of an electronic map of the parking lot of FIG. 2.
Figure 6:
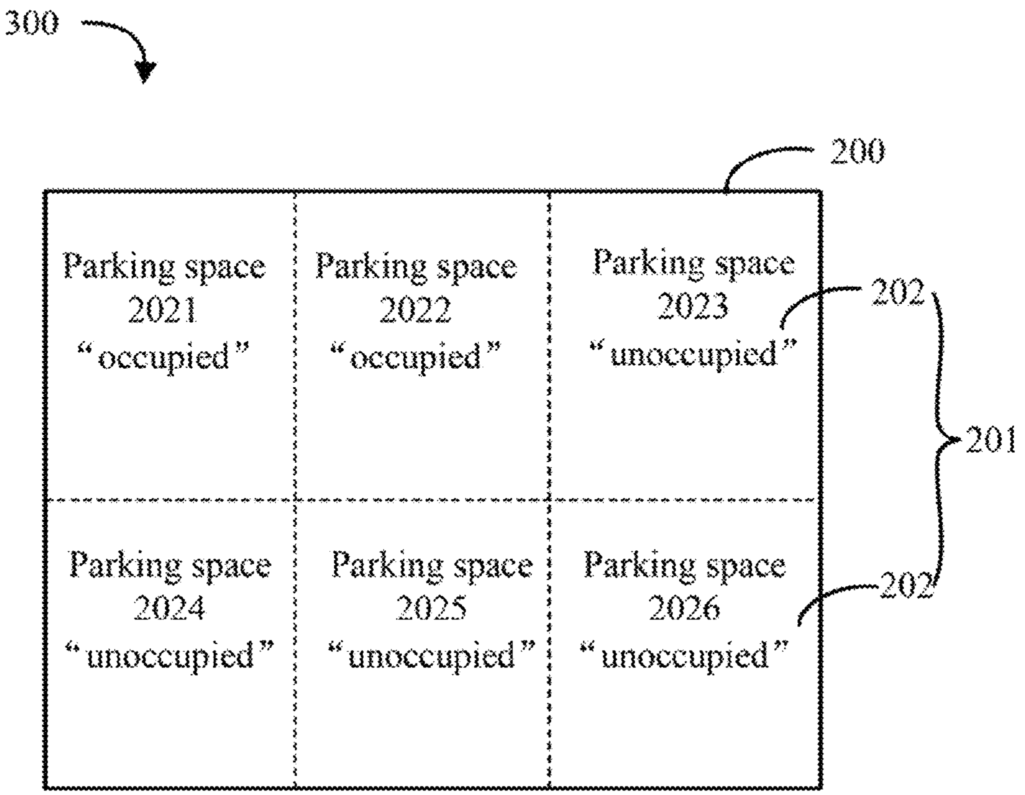
FIG. 6 is a diagrammatic view of the electronic map of FIG. 5 being updated with occupied information.

FIG. 5 illustrates that the electronic map 300 displays the parking spaces 202 and identification information of each parking space 202. The identification information of each parking space 202 can be a parking number of the parking space 202 (shown in FIG. 5 as 2021-2026. When the cloud server 2 receives the occupied information of each parking space 202 from the processor 12, the processor 22 updates the electronic map 300 to indicate the occupied information of each parking space 202. FIG. 6 illustrates that when the occupied information includes that the parking spaces 2021 and 2022 are occupied and that the parking spaces 2023-2026 are unoccupied, the processor 22 updates the electronic map 300 to indicate "occupied" to the parking spaces 2021 and 2022, and to indicate "unoccupied" to the parking spaces 2023-2026.

Figure 7:
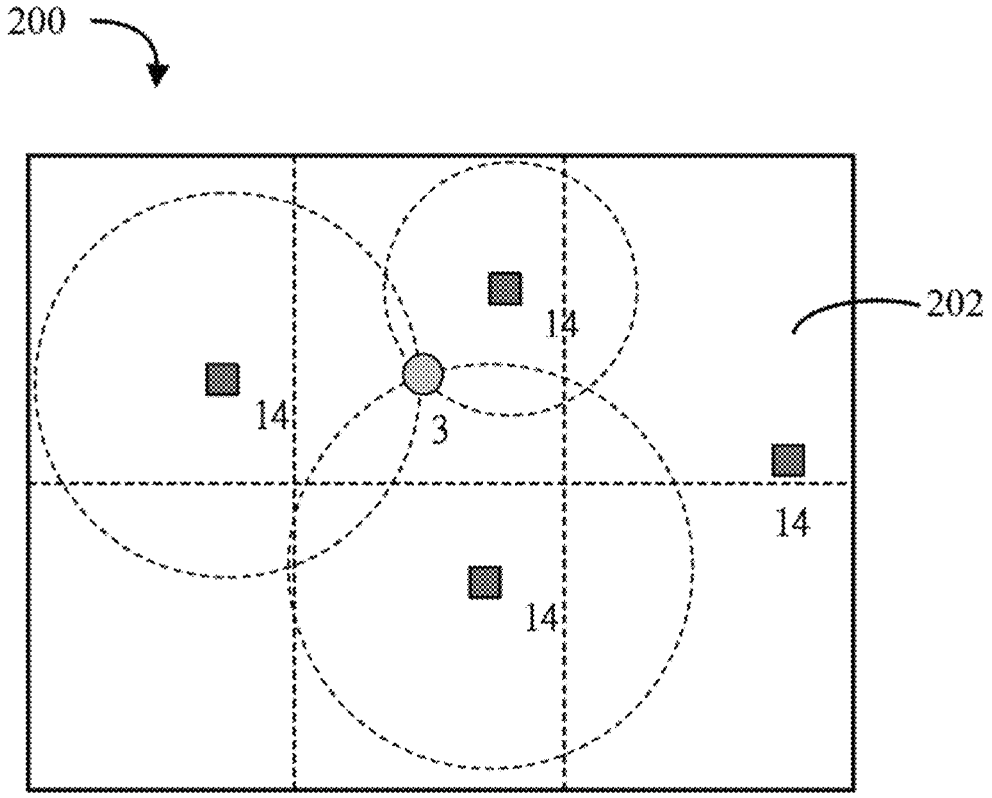
FIG. 7 is a diagrammatic view showing a mobile terminal communicating with at least three beacon devices included in the detecting device of FIG. 1.

The positioning device 13 of the detecting device 1 detects an original location of one mobile terminal 3 when the mobile terminal 3 enters the parking lot 200, and transmits the original location of the mobile terminal 3 to the cloud server 2. In at least one embodiment, each beacon device 14 of the detecting device 1 is mounted in one parking region 201, and is a BLUETOOTH low energy (BLE) station. Each beacon device 14 transmits BLUETOOTH signals including an identifier of the beacon device 14 and a received signal strength indicator (RSSI). The identifier of the beacon device 14 can be a media access control address (MAC) of the beacon device 14. The number of the beacon devices 14 and the location relationship of the beacon devices 14 relative to each other make sure that the BLUETOOTH signals transmitted by the beacon devices 14 covers all parking spaces 202, and that each mobile terminal 3 is able to simultaneously receive BLUETOOTH signals from at least three beacon devices 14 when the mobile terminal 3 enters the parking lot 200 (shown in FIG. 7), the mobile terminal 3 transmits an identification code of the mobile terminal 3, the identifiers of the at least three beacon devices 14, and the RSSI of the BLUETOOTH signals to the positioner 15. The identification code of the mobile terminal 3 can be the model number of the mobile terminal 3. When the mobile terminal 3 is a smart phone, the identification code can also be a SIM card number of the smart phone.

When the positioner 15 receives the identification code of the mobile terminal 3, the identifiers of the at least three beacon devices 14, and the RSSI of the BLUETOOTH signals from the mobile terminal 3, the positioner 15 determines a distance between the mobile terminal 3 and each of the at least three beacon devices 14 according to the identifier of the beacon device 14 and the corresponding RSSI, and determines an original location of the mobile terminal 3 in the parking lot 200 accordingly. The positioner 15 further transmits the original location of the mobile terminal 3 to the cloud server 2. It is notable that the distance between the mobile terminal 3 and one beacon device 14 is inversely proportional to the corresponding RSSI.

Figure 8:
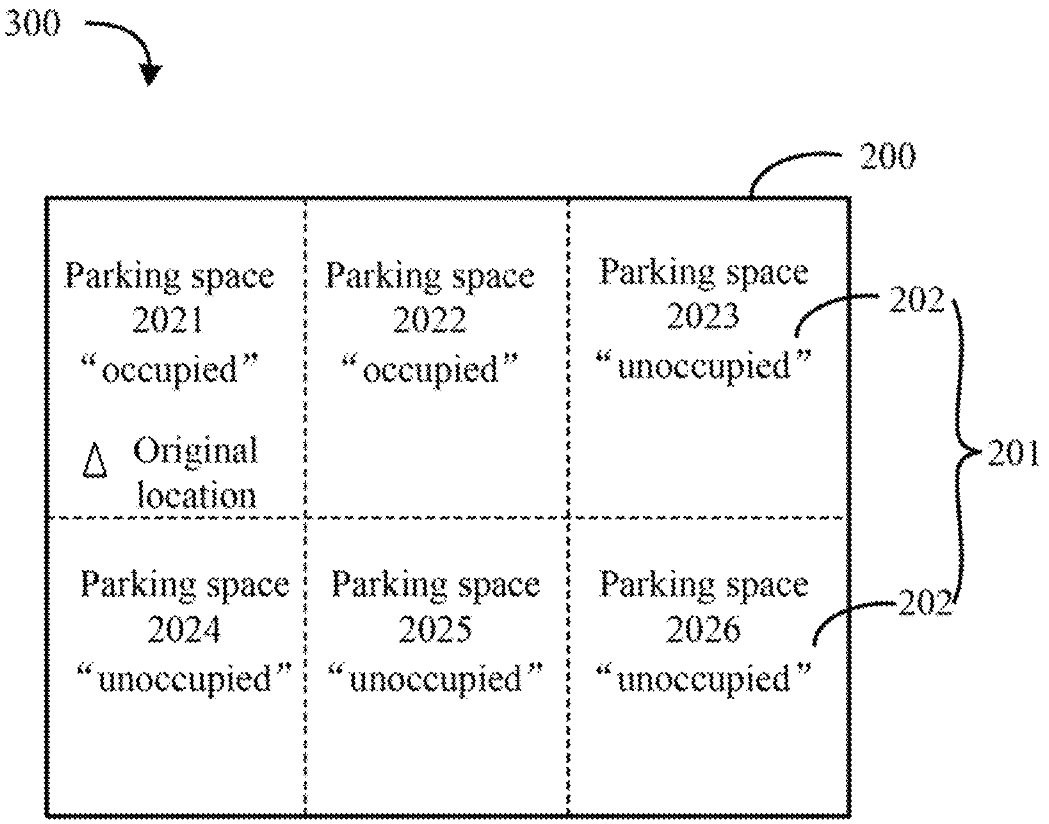
FIG. 8 is a diagrammatic view of the electronic map of FIG. 6 being updated with an original location of the mobile terminal.

When the positioning device 13 transmits the original location of the mobile terminal 3 to the cloud server 2, the processor 22 of the cloud server 2 updates the electronic map 300 to indicate the original location of the mobile terminal 3 (shown in FIG. 8), and transmits the electronic map 300 with the occupied information and the original location to the communication device 16 of the detecting device 1 or the mobile terminal 3. When the communication device 16 receives update data for the electronic map 300 with the occupied information and the original location, the communication device 16 transmits the electronic map 300 to the mobile terminal 3. As such, a driver can discover which parking space 202 is unoccupied according to the electronic map 300, select one unoccupied parking space 202 as a target parking space, and arrive at the target parking space according to a route from the original location to the target parking space displayed on the electronic map 300.

In another embodiment, the positioning unit 13 detects a real-time location of the mobile terminal 3 after the mobile terminal 3 enters the parking lot 200, and transmits the real-time location to the cloud server 2. Each time the cloud server 2 receives the real-time location of the mobile terminal 3 from the positioning unit 13, the processor 22 updates the electronic map 300 to indicate the real-time location of the mobile terminal 3, and transmits the electronic map 300 with the occupied information and the real-time location to the communication device 16 of the detecting device 1 or the mobile terminal 3. In this embodiment, the driver can arrive at the target parking space quickly according to a route from the location updated in real time to the target parking space displayed on the electronic map 300.

Figure 9:
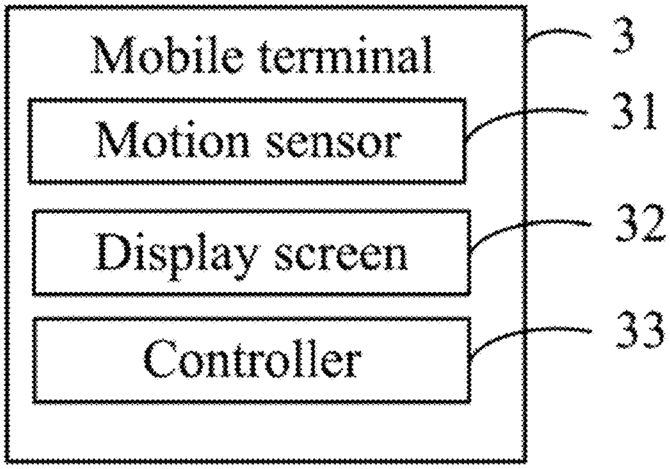
FIG. 9 is a block diagram of the mobile terminal of FIG. 7.
Figure 10:
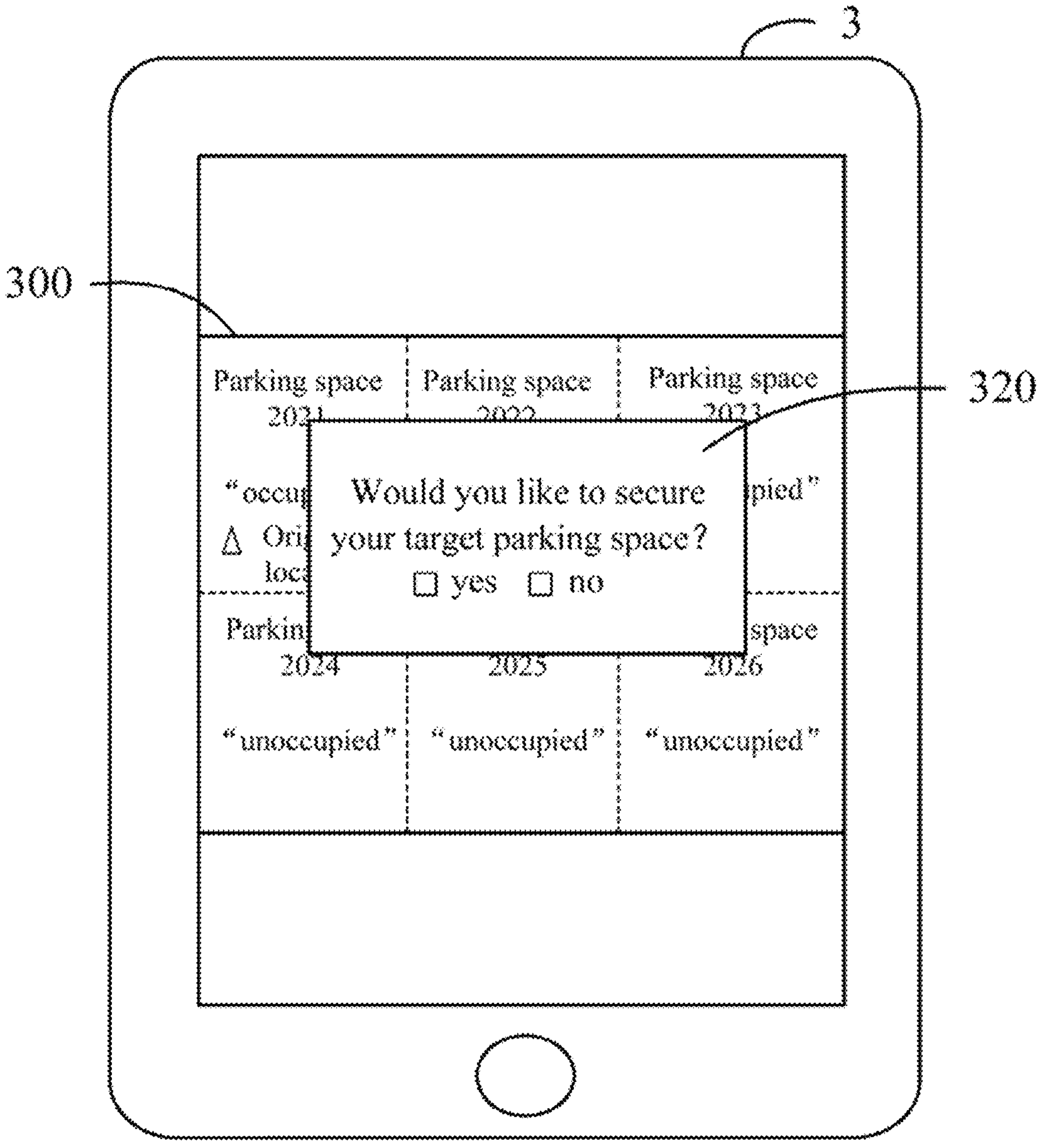
FIG. 10 is a diagrammatic view of a first user interface displayed by the mobile terminal after receiving the electronic map of FIG. 8.

FIG. 9 illustrates that the mobile terminal 3 includes a motion sensor 31, a display screen 32, and a controller 33. The motion sensor 31 detects whether the mobile terminal 3 stops moving when the mobile terminal 3 receives and displays the electronic map 300, and determines whether a stopped time period is greater than a preset time period. If so, the driver has possibly parked the vehicle in the target parking space, or the driver may get off the vehicle to find an available parking space, or there is a heavy traffic in the parking lot 200. The display screen 32 then displays a first user interface 320 (shown in FIG. 10). FIG. 10 illustrates that the first user interface 320 includes at least two options for the driver to select and secure the target parking space to prevent use from other drivers. For example, the first user interface 320 displays a question of "Would you like to secure your target parking space?", and a "yes/no" option for the driver to select whether to secure the target parking space. If the driver has parked the vehicle in the target parking space and wants to secure the target parking space, the driver can select the "yes" option. If a preset option (usually the "yes" option) is selected, the display screen 32 displays the electronic map 300 for the driver to select the target parking space. The controller 33 records the target parking space selected by the driver, and transmits the identification code of the mobile terminal 3 and the identification information of the target parking space to the cloud server 2.

Figure 11:
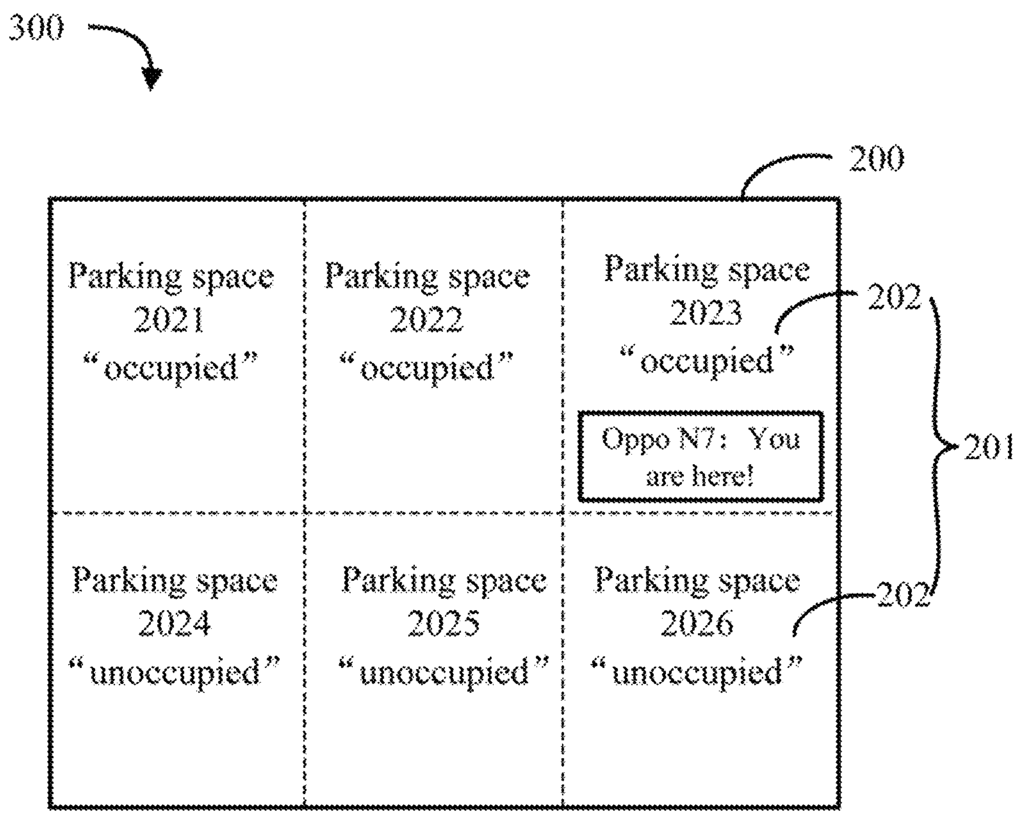
FIG. 11 is a diagrammatic view of the electronic map with updated occupied information and identification code of the mobile terminal after the first user interface of FIG. 10 is operated.

FIG. 11 illustrates that when the cloud server 2 receives the identification code of the mobile terminal 3 and the identification information of the target parking space the first time, the processor 22 of the cloud server 2 updates the occupied information of the target parking space displayed on the electronic map 300 (taking target parking space 2023 for example, the processor 22 updates the target parking space 2023 to be occupied), and adds the identification code of the mobile terminal 3 (for example, the model number of the mobile terminal 3, shown as "oppo N7") to the target parking space displayed on the electronic map 300. The processor 22 can further delete the original location of the mobile terminal 3 displayed on the electronic map 300.

Figure 12:
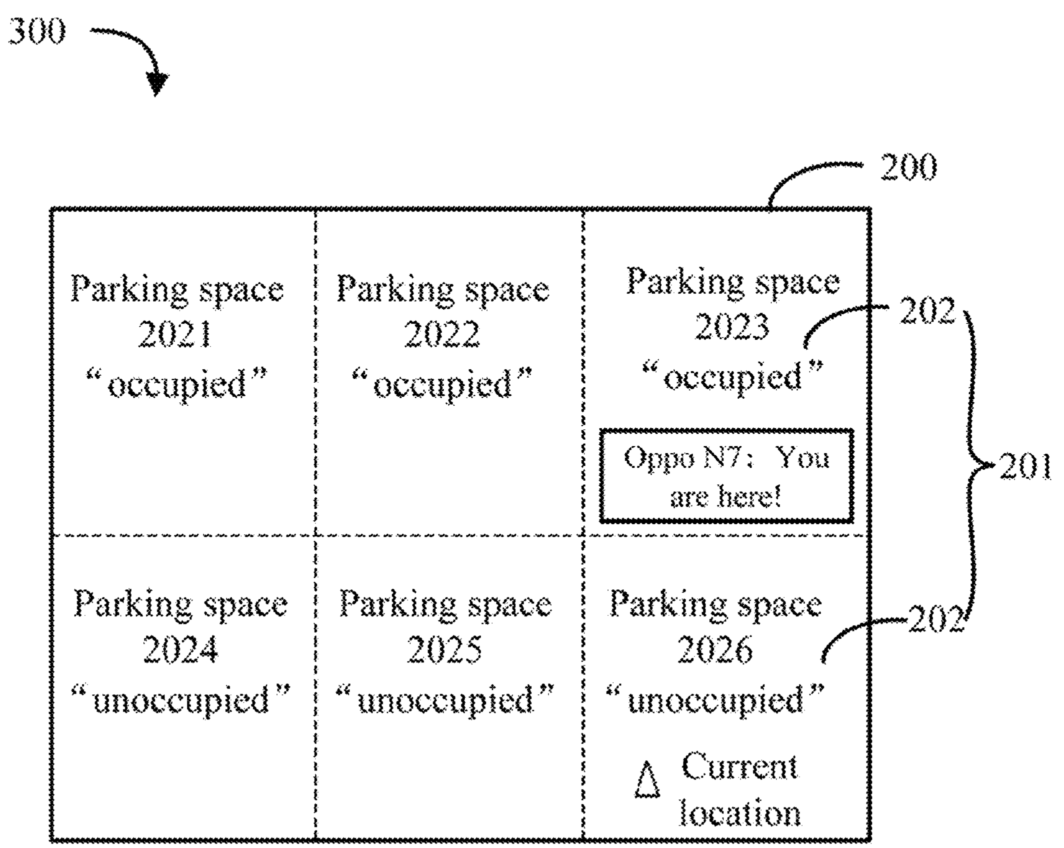
FIG. 12 is a diagrammatic view of the electronic map of FIG. 11 being updated with a current location of the mobile terminal.

When the driver with the mobile terminal 3 enters the parking lot 200 again, the positioning device 13 detects a current location of the mobile terminal 3, and transmits the original location of the mobile terminal 3 to the cloud server 2. FIG. 12 illustrates that the processor 22 of the mobile terminal 3 further updates the electronic map 300 to indicate the current location of the mobile terminal 3, and transmits the electronic map 300 with the current location of the mobile terminal 3 and the identification information on the target parking space to the communication device 16 of the detecting device 1 or the mobile terminal 3. When the communication device 16 receives the update data for the electronic map 300, the communication device 16 further transmits the electronic map 300 to the mobile terminal 3, to inform the mobile terminal 3 to display the electronic map 300. Thereby, the driver can quickly find the target parking space displayed on the electronic map 300 in which the vehicle has been parked according to the identification code of the mobile terminal 3, and quickly arrive at the target parking space according to a route from the current location to the target parking space displayed on the electronic map 300.

Figure 13:
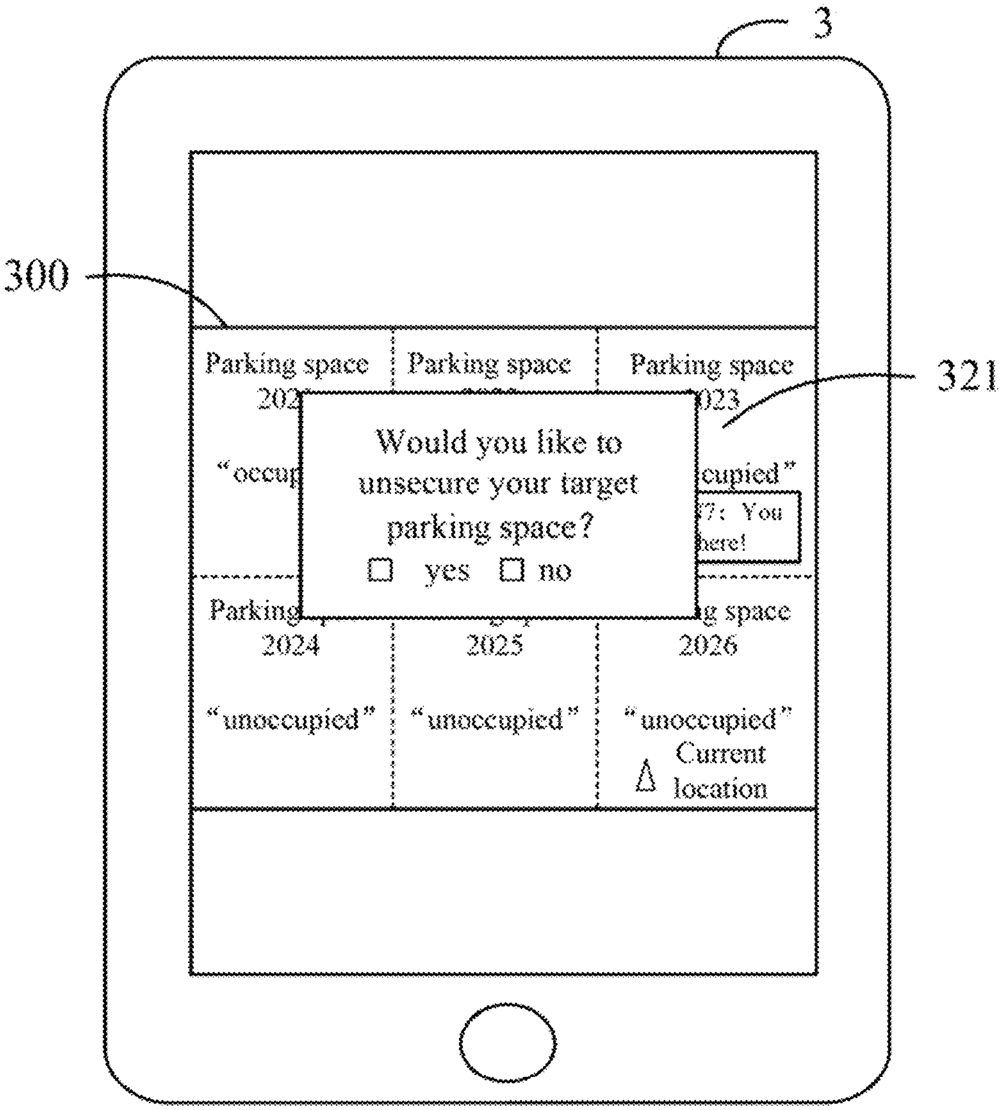
FIG. 13 is a diagrammatic view of a second user interface displayed by the mobile terminal after receiving the electronic map of FIG. 8.

In at least one embodiment, the processor 22 of the cloud server 2 further transmits a control signal to the mobile terminal 3 after the processor 22 transmits the electronic map 300 with the original location of the mobile terminal 3 and the identification information on the target parking space to the communication device 16 of the detecting device 1 or the mobile terminal 3. When the communication device 16 receives the control signal, the communication device 16 further transmits the control signal to the mobile terminal 3, to inform the display screen 32 of the mobile terminal 3 to further display a second user interface 321 (shown in FIG. 13). FIG. 13 illustrates that the second user interface 321 includes at least two options for the driver to select whether to unsecure the target parking space to allow use by other drivers. For example, the second user interface 321 displays a question of "Would you like to unsecure your target parking space?", and a "yes/no" option for the driver to select whether to unsecure the target parking space. If the driver wants to drive the vehicle away from the target parking space and unsecure the target parking space, the "yes" option can be selected. If "yes" is a preset option, the display screen 32 displays the electronic map 300 for the driver to select the target parking space. When the target parking space displayed on the electronic map 300 is selected by the driver, the controller 33 transmits the identification code of the mobile terminal 3 and the identification information of the target parking space to the cloud server 2 again.

The processor 22 of the cloud server 2 further updates the occupied information of the target parking space on the electronic map 300 (that is, updating the information of the target parking space 2023 to be unoccupied) when the cloud server 2 receives the same identification code of the mobile terminal 3 and the same identification information of the target parking space, and deletes the identification code of the mobile terminal displayed on the electronic map 300 (as shown in FIG. 6). As such, the occupied information of the target parking space on the electronic map 300 can be updated each time the target parking space is secured or unsecured by the driver.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A detecting device mounted in a parking lot including a plurality of parking regions, the detecting device capable of communicating with a cloud server and at least one mobile terminal in the parking lot, the cloud server storing an electronic map of the parking lot, the detecting device comprising:

a distance sensor configured to detect an occupied information of each parking space of each of the plurality of parking regions and transmit the occupied information to the cloud server;

a positioning device configured to detect an original location of one of the at least one mobile terminal once the mobile terminal enters the parking lot and transmits the original location to the cloud server, wherein the cloud server updates the electronic map to indicate the occupied information and the original location; and a communication device configured to receive update data for the electronic map with the occupied information and the original location;

wherein the positioning device comprises a plurality of beacon devices each mounted in one parking region and configured to transmit BLUETOOTH signals which include an identifier of the beacon device and a received signal strength indicator, to allow each mobile terminal to simultaneously receive BLUETOOTH signals from at least three beacon devices once the mobile terminal enters the parking lot; and a positioner, the positioner configured to receive an identification code of the mobile terminal, identifiers of the at least three beacon devices, and received signal strength indicators of the BLUETOOTH signals from the mobile terminal, the positioned configured to then determine a distance between the mobile terminal and each of the at least three beacon devices according to the identifier of the beacon device and the corresponding received signal strength indicator, the positioned configured to then determine the original location of the mobile terminal in the parking lot accordingly, and transmit the original location of the mobile terminal to the cloud server.

* * * * *